United States Patent
De Carvalho Costa et al.

(10) Patent No.: US 10,766,708 B2
(45) Date of Patent: Sep. 8, 2020

(54) GUIDE RAIL CONFIGURATION, CONVEYOR AND METHOD FOR CONVEYING CONTAINERS

(71) Applicant: SICPA HOLDING SA, Prilly (CH)

(72) Inventors: Diego De Carvalho Costa, Rio de Janeiro (BR); Raynier Douglas Barbosa Gomes, Rio de Janeiro (BR); Nilton Marchetto, Jaguariúna (BR)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 16/469,116

(22) PCT Filed: Nov. 8, 2017

(86) PCT No.: PCT/EP2017/078584
§ 371 (c)(1),
(2) Date: Jun. 12, 2019

(87) PCT Pub. No.: WO2018/108390
PCT Pub. Date: Jun. 21, 2018

(65) Prior Publication Data
US 2020/0017305 A1    Jan. 16, 2020

(30) Foreign Application Priority Data

Dec. 12, 2016 (WO) .................. PCT/EP2016/080611

(51) Int. Cl.
*B65G 47/82* (2006.01)
*B65G 21/20* (2006.01)
*B65G 47/76* (2006.01)

(52) U.S. Cl.
CPC ....... *B65G 21/2072* (2013.01); *B65G 47/766* (2013.01); *B65G 47/82* (2013.01);
(Continued)

(58) Field of Classification Search
CPC .................. B65G 21/2072; B65G 47/766
(Continued)

(56) References Cited

U.S. PATENT DOCUMENTS

| 4,173,276 A * 11/1979 | Raudat | B65G 43/08 198/437 |
| 5,101,959 A * 4/1992 | Whitby | B65G 47/22 198/456 |

(Continued)

FOREIGN PATENT DOCUMENTS

| CH | 709985 | 2/2016 |
| DE | 102013102202 | 9/2014 |

(Continued)

OTHER PUBLICATIONS

US 2009/0223782 A1, Martin et al., Sep. 9 (Year: 2009).*

(Continued)

*Primary Examiner* — Douglas A Hess
(74) *Attorney, Agent, or Firm* — Muncy, Geissler, Olds & Lowe, P.C.

(57) ABSTRACT

The present invention refers to a guide rail configuration for a conveyor and conveyor comprising a guide rail configuration, wherein the conveyor may, for example, be used for conveying products, packages or containers. The guide rail configuration may comprise a detector, in particular a distance sensor or a camera, configured to detect a distance to a lateral side of a container conveyed by the conveyor, or a lateral dimension of the container, wherein the actuator is activated on the basis of a measurement signal from the detector.

18 Claims, 3 Drawing Sheets

(52) U.S. Cl.
CPC ............... *B65G 2203/0233* (2013.01); *B65G 2203/042* (2013.01); *B65G 2207/08* (2013.01)

(58) Field of Classification Search
USPC ......... 198/502.2, 502.3, 836.1, 836.2, 836.3, 198/836.4
See application file for complete search history.

(56) References Cited

U.S. PATENT DOCUMENTS

| | | | | |
|---|---|---|---|---|
| 5,988,353 | A * | 11/1999 | Asai | H05K 13/0413 198/468.4 |
| 6,098,791 | A * | 8/2000 | Minnerop | B21B 39/14 198/597 |
| 6,305,528 | B1 * | 10/2001 | Leonard | B65G 21/2072 198/836.3 |
| 6,578,702 | B2 | 6/2003 | Falkowski | |
| 7,210,572 | B2 * | 5/2007 | Ingraham | B65G 21/2072 198/370.02 |
| 7,607,531 | B2 * | 10/2009 | Bonhomme | B65G 21/2072 198/442 |
| 8,104,606 | B2 * | 1/2012 | Rogers | B65G 47/22 198/860.3 |
| 8,132,665 | B2 * | 3/2012 | Pawelski | B65G 21/2072 198/836.1 |
| 8,490,776 | B2 | 7/2013 | Seger et al. | |
| 8,905,226 | B2 * | 12/2014 | Langanki | B65G 21/2072 198/803.11 |
| 8,955,668 | B2 * | 2/2015 | Cavallaro, III | B65G 21/2072 198/626.5 |
| 9,481,524 | B2 * | 11/2016 | Bell | B65G 21/2072 |
| 9,588,142 | B2 * | 3/2017 | Kiyokawa | G01R 1/06794 |
| 9,725,246 | B2 * | 8/2017 | Pawelski | F15B 15/1476 |
| 9,828,186 | B2 * | 11/2017 | Weickert | B65G 21/2072 |
| 9,845,205 | B2 | 12/2017 | Keller | |
| 2003/0085104 | A1 | 5/2003 | Falkowski | |
| 2012/0168283 | A1 | 7/2012 | Pawelski | |
| 2015/0008099 | A1 | 1/2015 | Huettner et al. | |
| 2016/0009498 | A1 | 1/2016 | Napravnik | |

FOREIGN PATENT DOCUMENTS

| | | |
|---|---|---|
| EP | 0962406 | 12/1999 |
| EP | 2110346 | 10/2009 |
| EP | 2821353 | 1/2015 |
| JP | 0472215 | 3/1992 |
| JP | 11227939 | 8/1999 |
| JP | 2016037368 | 3/2016 |
| WO | 2000017073 | 3/2000 |

OTHER PUBLICATIONS

US 2012/0097505 A1, Berger et al., Apr. 26 (Year: 2012).*
International Search Report and Written Opinion dated Nov. 12, 2018 with respect to application No. PCT/EP2017/078584, 13 pages.
International Preliminary Report on Patentability (IPRP) dated Mar. 19, 2019 with respect to application No. PCT/EP2017/078584, 16 pages.

* cited by examiner

GUIDE RAIL CONFIGURATION, CONVEYOR AND METHOD FOR CONVEYING CONTAINERS

TECHNICAL FIELD

The present invention refers to a guide rail configuration for a conveyor and conveyor comprising a guide rail configuration, wherein the conveyor may, for example, be used for conveying products, packages or containers (hereafter "container") from a feeding station to a handling device, a processing device or a machining device, or from one of these devices to another device/station or to an output station. The present invention refers in particular to a guide rail configuration and to a conveyor capable of processing a number of containers of various dimensions. Further, the present invention relates to a method for conveying containers.

BACKGROUND

Known conveyors comprise guiding structures, which are adjustable for setting various width and/or height positions.

Conveyors may be used for transporting containers to a printer head or marking device as specific examples of a processing device. These devices may be adjusted to larger or smaller containers so as to provide a printing or another kind of marking, for example a label, on a surface thereof.

For example, U.S. Pat. No. 6,578,702 B2 relates to a remotely adjustable railing support posts for conveyor lines. The adjustable railing support post system comprises a conveyor and a railing for the conveyor, wherein the conveyor is used for transporting several types of containers of various shapes and sizes. The railing is supported by a plurality of support posts, said support posts being each supported by a plurality of actuators. Each actuator is connected to a controller, said controller being operable to sequentially adjust the support posts relative to the conveyor until all of the support posts have been adjusted to transport containers of one particular shape and size. The controller has a memory to retain a position of each support post relative to the conveyor for each type of container to be transported. The memory is accessible to automatically return said support posts to a configuration to transport that type of container.

If a container of a different width is conveyed by the conveyor, it may move laterally while passing by the printer head, if the container is not securely guided. Thus, the printing quality may suffer, like a misprinted product pass or a not validated item, if the container is not reliably guided by the guiding structure. To avoid this drawback, an operator may manually adjust the guiding structure. However, the adjusting process needs to be performed a plurality of times if containers of different sizes are processed. There may be even cases where an operator cannot carry out the adjustment, since the guiding portion is covered by a protective wall or the like. In these cases, it may be necessary to stop the production process for adjusting the guiding structure.

Another drawback in art is that the guiding structure needs to be adjusted as a whole, which is relatively time-consuming.

In other cases, the container widths are entered manually and this information is saved in a memory of a controller. Later on, the information can be retrieved from the controller or by an operator pushing a bottom for performing the changeover. Consequently, errors may occur and adapting the guiding structure is time consuming.

The above examples referring to drawbacks are merely intended to enhance the understanding of the background of the invention and may contain information that is not known to the public.

SUMMARY OF THE INVENTION

One of the objections of the present invention is to provide a guide rail configuration and a conveyor to address one or more of the abovementioned drawbacks. In particular, a guide rail configuration and a conveyor shall be provided, which may securely guide containers, packages or products of various dimensions in an efficient manner.

Claim 1 provides a corresponding guide rail configuration and claim 10 relates to a conveyor according to the present invention. In addition, a method comprising the features of claim 12 is provided. Further preferred embodiments are mentioned in the dependent claims and in the following description.

In particular, a guide rail configuration suitable for guiding containers in a conveyor is proposed, wherein the guide rail configuration comprises at least one guiding structure. The guiding structure includes a guide element for guiding a container, an attachment member providing a mounting portion, like a plate body, for mounting the guiding structure to a portion of the conveyor, and an electric actuator, preferably a stepping motor (brushless DC electric motor), configured to move the guide element relatively to the attachment member. The guide rail configuration further comprises a detector, for example a distance sensor, like an infrared sensor or an ultrasound sensor, configured to detect a distance to a lateral side of a container conveyed by the conveyor, wherein the actuator is activated on the basis of a measurement signal from the distance sensor. Alternatively, in particular if the detector is a camera, the detector may detect a lateral dimension of a container conveyed by the conveyor.

Further, a camera may be used as the detector to determine the distance between the container and the guide rail. According to a preferred embodiment, the camera is placed above the product and can use the images to measure the distance between the borders.

According to the present invention, the position of the guiding element may be adjusted on the basis of a measurement signal retrieved from the detector. Thus, the guiding element can be rearranged and specifically adjusted to a container detected by the detector without stopping the conveying process.

According to a preferred embodiment, the electric actuator is configured to provide a rotational movement converted to a linear movement of the guide element, thus providing a precise adjustment of the guide element.

Preferably, the actuator is mounted on the attachment member so that the moveable guide element has a relatively low weight.

In another embodiment, the guide element comprises a guiding portion and a support, wherein at least end portions of the guiding portion are connected to the support, the guiding portion comprising an inclined portion which is inclined in the conveying direction. Thereby, a container can be smoothly guided by the guide element.

Preferably, the guide element is mounted on a vertical support. In particular, the guide element may be mounted on the vertical support in a releasable manner. Therefore, the guide element may be rearranged relatively to the vertical support, thereby adjusting the vertical position of the guide element.

In a further modification of the present invention, the guide rail configuration further comprises a first shaft and second shaft connecting the attachment member and the guide element, in particular the attachment member and the vertical support supporting the guide element. Further, the shaft (near the motor) may comprise a gear, whereas the second shaft may be a guide for the movement and the force distribution. First shaft and/or the second shaft is provided with a gear, in particular a bevel gear, which is in engagement with a gear, preferably a bevel gear, of the actuator. Thereby, a very precise adjustment of the guide element can be obtained.

In a preferred embodiment, the second shaft is rotatable, while the first shaft is a guide for providing or stabilizing a translational movement. Thus, the bearing ring of the first shaft is a movement stabilizer. At least one of the bearings for the second (rotatable) shaft is a spindle nut that may transfer a movement from a motor to the movable assembly including the guide element.

Preferably, the guide rail configuration comprises a controller (local controller unit), in particular a programmable logic controller, wherein the controller is configured to compare a measurement signal from the detector with one or more previous measurement signals. Using a local controller assure an exceptionally fast rearrangement of the guide element.

According to another embodiment of the present invention, the guide rail configuration comprises two guiding structures arranged opposite to each other. Thus, two lateral guide elements may be adjusted, thereby centering a container transported by the conveyor. Preferably, the guide rail configuration further comprises two detectors, like two distance sensors, arranged opposite to each other. Each of the detectors may provide a measurement signal for each of the guiding structures.

A second detector could be used to provide a redundant signal or the second detector could provide a signal to increase accuracy or even a signal required for the system to work. However, using only one detector may be suitable to control both sides of the automatic adjustment.

The present invention also refers to a conveyor. The conveyor comprises a supporting structure and a conveying element, in particular a conveyor belt, one or more conveying chains, one or more conveying straps or a plurality of conveying rolls, wherein the conveyor further comprises one or more guide rail configuration according to any of the abovementioned embodiments.

In a preferred embodiment, the conveyor comprises a printer or a labeling device for applying a marking or a label to a container guided by the guide element. Since the guide element is specifically adjusted to the container conveyed by the conveyor, an exceptionally high-class printing or labeling may be obtained.

According to a preferred modification, the conveyor comprises a main controller, in particular a programmable logic controller, wherein the main controller is configured to compare a measurement signal from the detector with one or more previous measurement signals. Therefore, actuators of a plurality of guide rail configurations may be activated by a central unit.

The present invention also relates to a method of guiding a container in a conveyor, in particular a conveyor according to any of the above mentioned embodiments. The method comprises the steps of: moving a container in a conveying direction, detecting a lateral side or a lateral dimension of the container and moving a guide element, in particular in a horizontal direction, on the basis of a measurement signal from the detector.

According to a preferred embodiment, the step of detecting takes place either by means of a distance sensor or a camera. If a distance sensor is used, a distance to the lateral side of the container is detected, and the measurement signal of the distance sensor is used to evaluate to which extend the guide element is to be moved for providing a guiding operation, for example contact with to a lateral side of the container. On the other hand, if a camera is used, the camera may detect a lateral dimension of the container. Alternatively, a camera may also be used for detecting a lateral side of the container. In both cases, the measurement signal of the camera is used to evaluate to which extend the guide element is to be moved for providing a guiding operation.

According to a further embodiment, a distance sensor and a camera may be used.

On the basis of the detected distance or the lateral dimension of the container, it can be determined whether a gap is to be expected between the lateral side of the container, or whether the container would collide with the guide element. In cases like these, the guide element will be moved, thereby adapting the position of the guide element.

Accordingly, the position of the guiding element may be adjusted on the basis of a measurement signal retrieved from the detector. Consequently, the position of the guiding element can be specifically adjusted to a container detected by the detector without stopping the conveying process. Therefore, an exceptionally efficient method can be provided.

Preferably, the measurement signal from the detector is compared with one or more previous measurement signals and the guiding element is moved on the basis of a deviation between the current measurement signal and the one or more previous measurement signals.

In a subsequent step, the container securely guided by the guiding element may be treated in a printing process and/or a labelling may be attached to the container.

BRIEF DESCRIPTION OF THE DRAWINGS

The invention may be better understood by reference to the following specification and taken in conjunction with the accompanying drawings.

Figure 1:
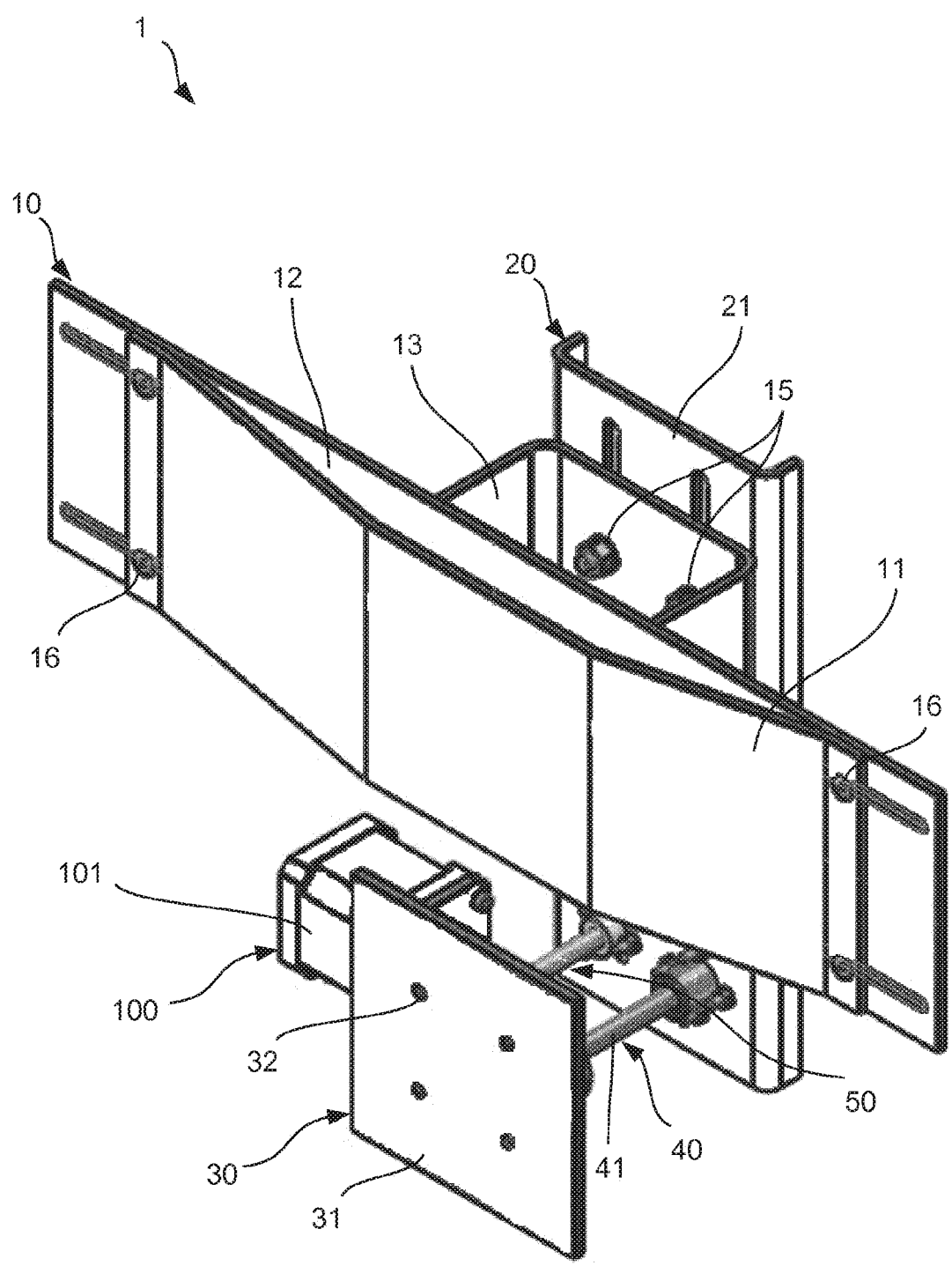
FIG. 1 is perspective view of a guide rail configuration used in a conveyor according to a preferred embodiment of the present invention.

The present figures relate to schematic drawings so that any dimension of the elements shown in the drawings may deviate from a specifically implemented setup.

DETAILED DESCRIPTION OF A PREFERRED EMBODIMENT

A preferred embodiment of the present invention is hereafter described in further detail. The description and the accompanying drawings are to be construed by ways of example and not of limitation. For example, modifications of specific elements of the preferred embodiment described hereafter may be combined with other modifications so as to provide further embodiments of the present invention.

The guide rail configuration comprises a guiding structure 1, the guiding structure 1 including a guide element 10 with a guiding portion 11, a support 12 and a carrier 13. End sections of the guiding portion 11 are attached to the support 12 via screws 16.

Although the guiding portion 11, the support 12 and the carrier 13 are according to the present embodiment provided as separate members, in particular sheet of polymeric material, PE, Nylon or the like, attached to each other, the guide element 10 may also be a single component.

Figure 2:
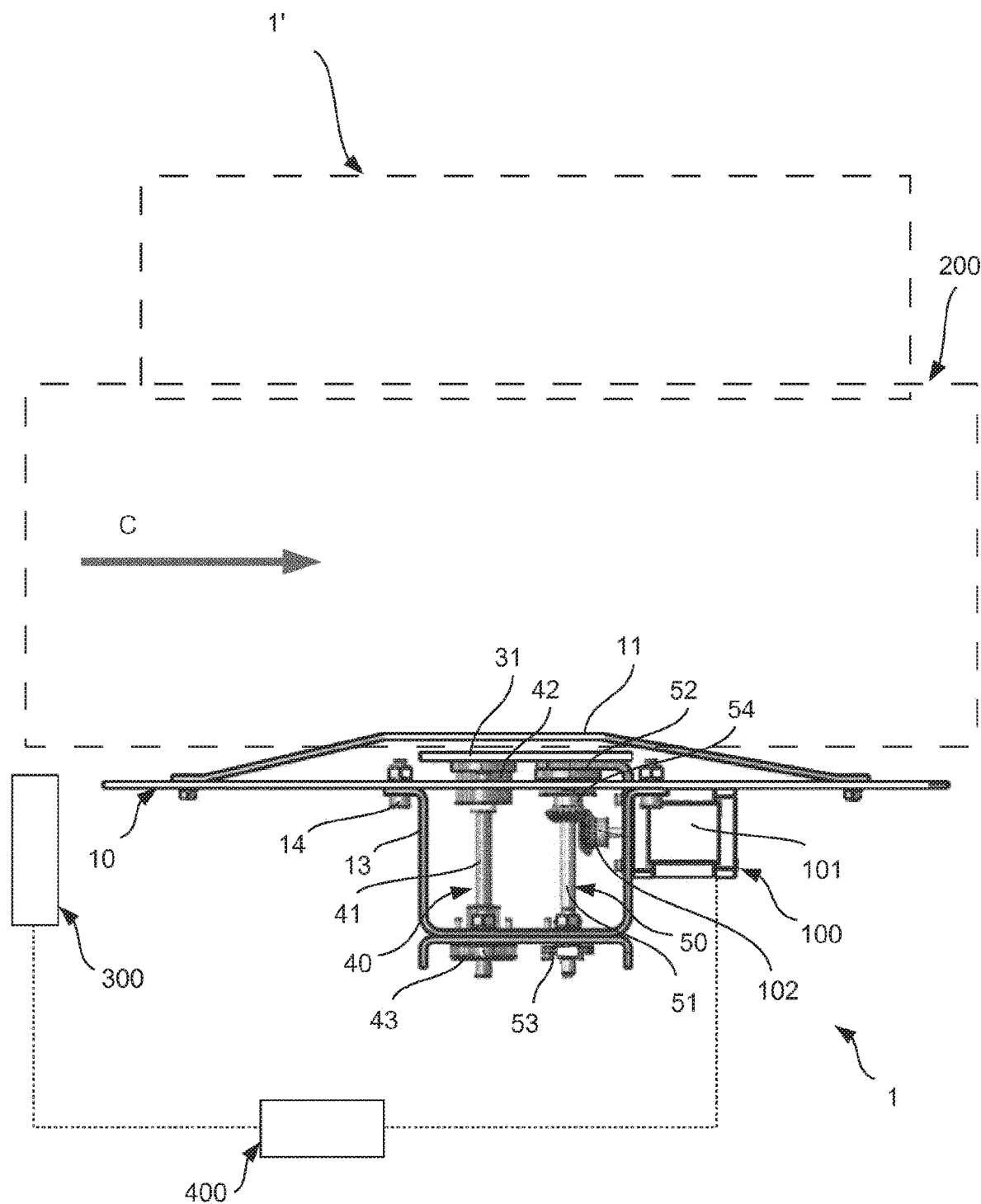
FIG. 2 is a plan view of the guide rail configuration shown in FIG. 1.
Figure 3:
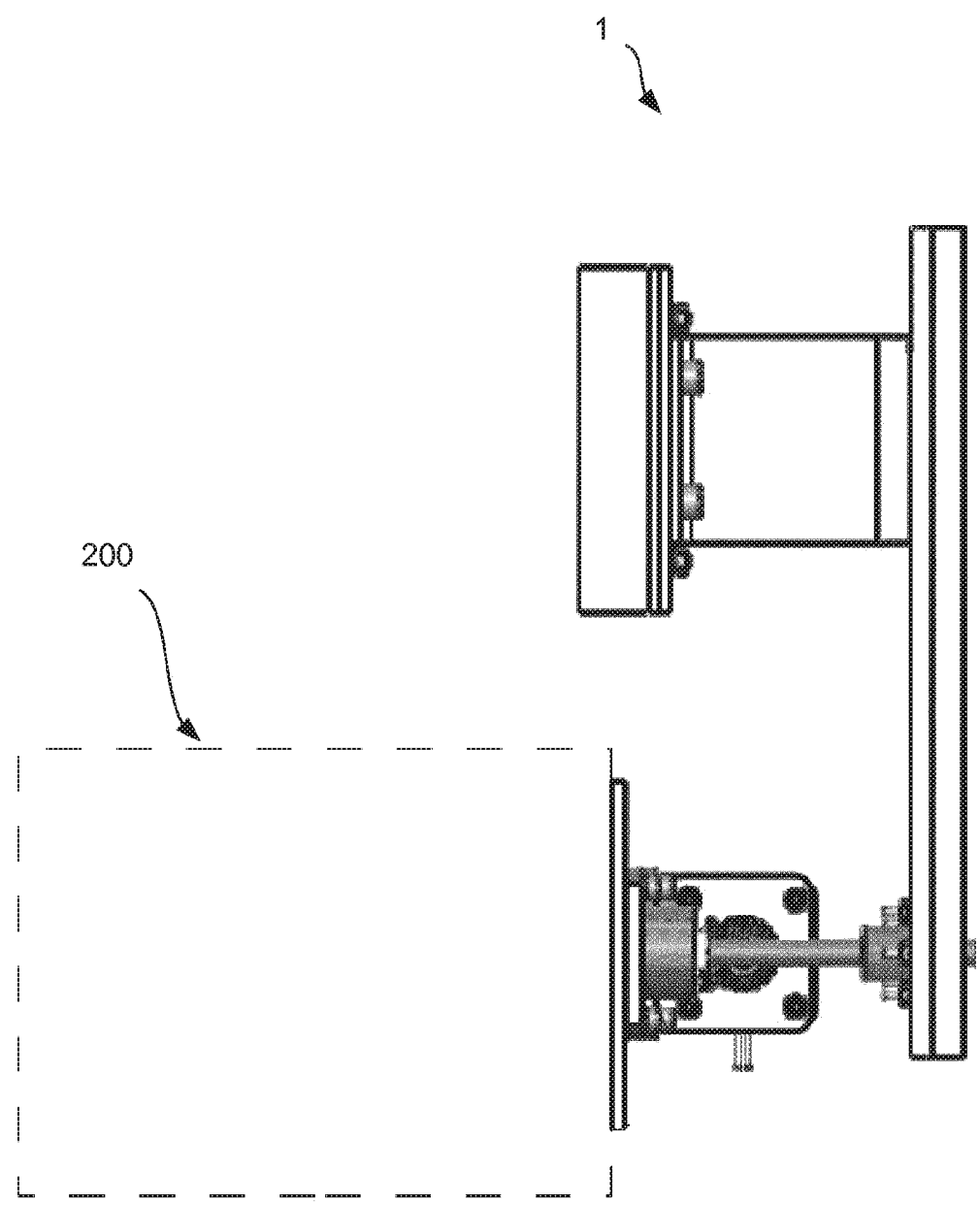
FIG. 3 is a side view of the guide rail configuration shown in FIG. 1.

The guiding portion 11 and the support 12 extend in a conveying direction C, when mounted to the conveyor 200 (which is schematically shown in FIG. 2). The conveyor 200 used for moving containers, for example by a conveyor belt, one or more conveying chains, one or more conveying straps and/or a plurality of conveying rolls.

The guiding portion 11 comprises, in the conveying direction C, an inclined portions, a substantially flat portion and a further portion declining towards the support 12. Thereby, the guiding portion 11 is partially distanced from the support 12.

The support 12 is, according to the present embodiment, attached to the carrier 13 via screws 14, wherein the carrier 13 has, in a plan view, a substantially rectangular shape. Accordingly, a rigid structure is provided by the present configuration.

The carrier 13 of the guide element 10 is mounted to a support body 21 of a vertical support 20 via screws 15. Therefore, the guide element 10 and the vertical support 20 may be moved together. Since longitudinal through holes 22 are provided in the support body 21 of the vertical support 20 and the screws 15 are inserted through the longitudinal through holes 22 upon mounting, the guide element 10 may be shifted in a vertical direction by partially releasing the screws 15 so as to position or re-position the guide element 10 in a vertical direction.

The guiding structure 1 is attached to a conveyor 200, in particular a supporting structure thereof, by an attachment member 30, which attachment member 30 is connected to the vertical support 20 via a first shaft 40 and a second shaft 50. The attachment member 30 comprises a plate body 31 and a plurality of through holes 32 for attaching the plate body 31 to the conveyor 200, in particular a supporting structure thereof.

The first shaft 40 comprises a first shaft body 41, which is fixedly mounted on the plate body 31 via a first bearing ring 42. The first bearing ring 42 is a movement stabilizer. Another end portion of the first shaft body 41 is introduced into a first bearing 43, the first bearing 43 being fixedly mounted on the support body 21. The first bearing 43 is preferably a friction bearing, which allows the first shaft body 41 to slide relatively to the support body 21. In particular, a friction bearing with a relatively low coefficient of friction is preferred.

The second shaft 50 comprises a second shaft body 51, which is connected to the plate body 31 via a second bearing ring 52. The second bearing ring 52 is a spindle nut that transfers the rotational movement from the motor to a translational movement of the vertical support 20. On a portion of the second shaft body 51 opposite to the fixing position of the second bearing ring 52, the second shaft body 51 is introduced into a spindle nut 53. The spindle nut 53 is providing a translational movement when turning the spindle nut. The shaft 51 is rotated by the bevel gear assembly and transfers the movement by the spindle nut 53 to the vertical support 20.

A bevel gear 54 is attached to the second shaft body 51 so that the second shaft 50 may be driven by an actuator, which is, according to the preferred embodiment, provided by a stepping motor 100 (actuator).

The 24VD stepping motor 100 (brushless DC electric motor) is attached to the attachment member 30. The stepping motor 100 comprises a casing 101 and a bevel gear 102. The bevel gear 102 of the stepping motor 100 is in engagement with the bevel gear 54 mounted on the second shaft body 51. Thus, turning the bevel gear 102 of the stepping motor 100 in a clockwise or anticlockwise direction leads to an axial movement of the vertical support 20 in a direction perpendicular or substantially perpendicular to the conveying direction C.

The guide rail configuration is provided with a distance sensor 300 (detector) provided at an upstream position of the guiding structure 1. The distance sensor 300 is configured to detect a distance to a container conveyed by the conveyor 200.

In particular, the distance sensor is used for detecting the distance between a reference element, like the guiding portion 11, and containers being moved in the conveying direction C. The measurement signal of the distance sensor 300 is forwarded to a controller 400.

The measurement signal or any data retrieved from the distance sensor 300 (hereafter "measurement data") is stored in a logic array of the controller 400, when a new container is in the production line and moved in the conveying direction C. The controller, 400 which is preferably a programmable logic controller (PLC), compares the measurement data with previous measurement data by using a statistical approach (average and deviation). On the basis of the comparison, the controller 400 may decide whether a product having a different width dimension is conveyed by the conveyor 200, and in case a new container having a different width dimension is detected, the controller 400 sends a signal to the stepping motor 100 so as to move the guiding element 10.

The stepping motor 100 may rotate the bevel gear 102, which is in engagement with the bevel gear 54, thereby moving the vertical support 20 and the guide element 10 attached thereto, in particular the guiding portion 11 of the guide element 10, in a direction perpendicular to the conveying direction C. In other words, the stepping motor 100 may turn the bevel gear 102 clockwise to move the guide element 10 towards a container passing the guiding structure 1, or in a counterclockwise direction so as to move the vertical support 20 and, therefore, also the guide element 10, in an opposite direction.

Although it is preferred to provide two guiding structures 1, 1' opposite to each other (plan view of FIG. 2), the present disclosure also refers to an adjustable guiding structure 1 positioned adjacent to a fixed guiding structure.

Further, in addition or instead of the controller 400, a main controller of the conveyor may be used for performing the above mentioned steps.

The invention claimed is:

1. A guide rail configuration suitable for guiding containers in a conveyor, the guide rail configuration comprising at least one guiding structure, including:
   a guide element for guiding a container, the guide element comprising a guiding portion, a support and a carrier, wherein end portions of the guiding portion are connected to the support;
   wherein the guide rail configuration further comprises:
      an attachment member providing a mounting portion for mounting the guiding structure to a portion of the conveyor,
      an electric actuator, configured to move the guide element relatively to the attachment member, wherein the guiding portion comprises, in the conveying direction, an inclined portion which is inclined in the conveying direction, a substantially flat portion and a portion declining towards the support, such that the guiding portion is partially distanced from the support,
   and wherein the guide rail configuration further comprises:
      a first shaft and a second shaft connecting the attachment member and a vertical support supporting the guide element, wherein the carrier is mounted to a support body of a vertical support via screws such that, the guide element and the vertical support are movable together, wherein the support body of the vertical support comprises longitudinal through holes for the screws to be inserted through them upon mounting, the guide element is shiftable in a vertical direction by partially releasing the screws so as to position the guide element in a vertical direction, and
      a detector, in particular a distance sensor or a camera, configured to detect a distance to a lateral side of a container conveyed by the conveyor or a lateral dimension of the container, wherein the electric actuator is activated on the basis of a measurement signal from the detector.

2. The guide rail configuration according to claim 1, wherein the first shaft and/or the second shaft is provided with a gear which is in engagement with a gear or the actuator.

3. The guide rail configuration according to claim 1, wherein the electric actuator is a stepping motor.

4. The guide rail configuration according to claim 1, wherein the electric actuator is configured to provide a rotational movement converted to a linear movement of the guide element.

5. The guide rail configuration according to claim 1, wherein the electric actuator is mounted on the attachment member.

6. The guide rail configuration according to claim 1, wherein the guide element is mounted on a vertical support.

7. The guide rail configuration according to claim 6, wherein the guide element is mounted on the vertical support in a releasable manner so that the guide element may be rearranged relatively to the vertical support.

8. The guide rail configuration according to claim 1, wherein the first shaft and the second shaft connect the attachment member and the carrier of the guide element via the vertical support, wherein the first shaft and/or the second shaft is provided with a bevel gear which is in engagement with a bevel gear of the electric actuator.

9. The guide rail configuration according to claim 8, wherein one of the shafts, in particular the second shaft, extends through a spindle nut.

10. The guide rail configuration according to claim 1, wherein the guide rail configuration comprises a controller, in particular a programmable logic controller, wherein the controller is configured to compare a measurement signal from the detector with one or more previous measurement signals of the detector.

11. The guide rail configuration according to claim 1, comprising two guiding structures arranged opposite to each other.

12. The guide rail configuration according to claim 11, further comprising two distance sensors arranged opposite to each other.

13. A conveyor for conveying containers, the conveyor comprising a supporting structure and a conveying element, in particular a conveyor belt, one or more conveying chains, one or more conveying straps or a plurality of conveying rolls,
   wherein the conveyor further comprises at least one guide rail configuration according to claim 1.

14. The conveyor according to claim 13, further comprising a main controller, in particular a programmable logic controller, wherein the main controller is configured to compare a measurement signal from the detector with one or more previous measurement signals, and/or the conveyor further comprising a printer or a labeling device for applying a marking or a label to a container guided by the guide element.

15. A method of guiding a container in a conveyor according to claim 13, comprising the following steps:
   moving a container in a conveying direction,
   detecting a lateral side or a lateral dimension of the container, in which method detecting preferably takes place either by means of a distance sensor and/or a camera, and
   moving a guide element on the basis of a measurement signal from the detector, in particular in a horizontal direction.

16. The method according to claim 15, wherein the measurement signal from the detector is compared with one or more previous measurement signals and the guiding element is moved on the basis of a deviation between the current measurement signal and the one or more previous measurement signals.

17. The method according to claim 15, wherein moving the guide element is performed by converting a rotational movement of an electric actuator, in particular a stepping motor, to a linear movement of the guide element, and/or the method is characterized by instructing a printer or labeling device for applying a marking or a label to the container guided by the guide element.

18. The method according to claim 15, wherein the step of detecting refers to detecting a distance to the container in a direction traverse the conveying direction, in particular a horizontal direction, and/or detecting a lateral dimension of the container, the lateral dimension being a dimension in a direction traverse the conveying direction.

* * * * *